(12) United States Patent
Sworen et al.

(10) Patent No.: US 10,138,594 B2
(45) Date of Patent: *Nov. 27, 2018

(54) PARTIALLY FLUORINATED URETHANE BASED COATINGS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Mario Vincenzini, Coatesville, PA (US); Ewa Kohler, West Chester, PA (US); Tatsiana Haidzinskaya, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/852,740

(22) Filed: Sep. 14, 2015

(65) Prior Publication Data

US 2016/0090688 A1    Mar. 31, 2016

Related U.S. Application Data

(60) Provisional application No. 62/055,820, filed on Sep. 26, 2014.

(51) Int. Cl.

| C08G 18/00 | (2006.01) |
| D06M 15/576 | (2006.01) |
| C08G 18/73 | (2006.01) |
| C08G 18/75 | (2006.01) |
| C08G 18/28 | (2006.01) |
| C08G 18/70 | (2006.01) |
| C08G 18/32 | (2006.01) |
| C09D 175/08 | (2006.01) |
| C08G 18/36 | (2006.01) |
| B05D 1/02 | (2006.01) |
| B05D 1/18 | (2006.01) |
| B05D 1/28 | (2006.01) |
| C09D 175/06 | (2006.01) |
| C08G 18/78 | (2006.01) |
| C08G 18/79 | (2006.01) |
| C09D 175/04 | (2006.01) |

(52) U.S. Cl.
CPC ............ *D06M 15/576* (2013.01); *B05D 1/02* (2013.01); *B05D 1/18* (2013.01); *B05D 1/28* (2013.01); *C08G 18/281* (2013.01); *C08G 18/282* (2013.01); *C08G 18/283* (2013.01); *C08G 18/284* (2013.01); *C08G 18/2885* (2013.01); *C08G 18/3221* (2013.01); *C08G 18/3246* (2013.01); *C08G 18/36* (2013.01); *C08G 18/706* (2013.01); *C08G 18/73* (2013.01); *C08G 18/755* (2013.01); *C08G 18/7831* (2013.01); *C08G 18/792* (2013.01); *C09D 175/04* (2013.01); *C09D 175/06* (2013.01); *C09D 175/08* (2013.01); *D06M 2200/01* (2013.01); *D06M 2200/12* (2013.01)

(58) Field of Classification Search
CPC .. C08G 18/281; C08G 18/283; C08G 18/284; C08G 18/3221; C08G 18/36; C08G 18/706; C08G 18/73; C08G 18/755; C08G 18/7831; C08G 18/792; C08G 18/3812; C08G 18/5015; C08G 18/6279; C09D 175/06; C09D 175/08

See application file for complete search history.

(56) References Cited

U.S. PATENT DOCUMENTS

| 3,049,513 | A | 8/1962 | Damusis |
| 3,505,001 | A | 4/1970 | Wagner |
| 4,297,290 | A | 10/1981 | Stockburger |
| 4,304,683 | A | 12/1981 | Morinaka et al. |
| 4,360,447 | A | 11/1982 | Morinaka et al. |
| 4,388,372 | A | 6/1983 | Champaneria et al. |
| 6,864,312 | B2 * | 3/2005 | Moore ............... C08G 18/0828 524/591 |
| 7,344,758 | B2 | 3/2008 | Franchina et al. |
| 8,349,986 | B2 | 1/2013 | Rukavina et al. |
| 8,586,697 | B2 | 11/2013 | Elizalde et al. |
| 2003/0120101 | A1 | 6/2003 | Lai |
| 2005/0085573 | A1 | 4/2005 | Sandner et al. |
| 2006/0052556 | A1 | 3/2006 | Franchina et al. |
| 2006/0151739 | A1 | 7/2006 | Sandner et al. |
| 2006/0188729 | A1 | 8/2006 | Schubert et al. |
| 2007/0009663 | A1 | 1/2007 | Wang et al. |
| 2007/0167601 | A1 | 7/2007 | Rukavina et al. |
| 2008/0146750 | A1 | 6/2008 | Corn et al. |

(Continued)

FOREIGN PATENT DOCUMENTS

| CN | 101914165 A | 12/2010 |
| EP | 2415879 | 8/2010 |

(Continued)

OTHER PUBLICATIONS

International Search Report and Written Opinion, PCT/US2015/049892, dated Nov. 20, 2015.

(Continued)

*Primary Examiner* — Michael L Leonard

(57) ABSTRACT

A compound for imparting water repellency and optionally stain release to substrates wherein the compound is prepared by reacting (a) at least one isocyanate group-containing compound, (b) at least one isocyanate-reactive compound and (c) at least one fluorinated isocyanate-reactive compound.

11 Claims, No Drawings

(56) References Cited

U.S. PATENT DOCUMENTS

| | | |
|---|---|---|
| 2010/0124649 A1 | 5/2010 | Rukavina et al. |
| 2010/0190397 A1 | 7/2010 | Duschek et al. |
| 2013/0288066 A1 | 10/2013 | Reiners et al. |
| 2014/0031483 A1 | 1/2014 | Elizalde et al. |
| 2014/0295724 A1 | 10/2014 | Sworen et al. |

FOREIGN PATENT DOCUMENTS

| | | |
|---|---|---|
| GB | 887387 | 1/1962 |
| GB | 1360007 | 7/1974 |
| JP | 1972003477 B | 1/1972 |
| JP | 1973004940 | 1/1973 |
| JP | 1983079008 | 5/1983 |
| JP | 1985045678 B2 | 10/1985 |
| JP | 05331130 A | 12/1993 |
| KR | 2009002894 A1 | 1/2009 |
| WO | 200037525 A1 | 6/2000 |
| WO | 2003089477 A1 | 10/2003 |
| WO | 2006024669 A1 | 3/2006 |
| WO | 200640333 A1 | 4/2006 |
| WO | 2009015136 A1 | 1/2009 |
| WO | 2011124710 A | 10/2011 |
| WO | 2014160905 A1 | 10/2014 |
| WO | 2014160906 A2 | 10/2014 |

OTHER PUBLICATIONS

Mao et al., Effect of additives on microstructure and properties of polyurethane coating film for fabrics, Fangzhi Xuebao (1996), 17(2), 4-7 (Abstract attached).

* cited by examiner

PARTIALLY FLUORINATED URETHANE BASED COATINGS

FIELD OF INVENTION

This invention relates to a composition comprising an organic urethane compound useful for imparting durable water repellency and optionally stain release to textiles.

BACKGROUND OF THE INVENTION

Various compositions are known to be useful as treating agents to provide water repellency and optionally stain release to textile substrates. Many such treating agents are fluorinated polymers and copolymers, or non-fluorinated polymers and copolymers. Non-fluorinated compounds are predominately polyacrylate-based or urethane-based copolymers.

Fluorinated copolymers provide good repellency to water and oil. Various attempts have been made to produce a non-fluorinated water repellent. Non-fluorinated copolymers are known to provide water repellency and optionally stain release to textiles, but are less effective than the fluorinated counterparts.

Moore, in U.S. Pat. No. 6,864,312, discloses a polyurethane polymer that provides moisture resistance. Moore claims polyurethane polymer particle dispersions, where the polyurethane polymers are isocyanate-terminated prepolymers prepared from a formulation including a polyisocyanate and a polyol.

SUMMARY OF INVENTION

The need exists for compounds that provide water repellency and optionally stain release for textiles, with performance results comparable to fluorinated treating agents. The present invention meets these needs.

The present invention comprises a partially fluorinated organic urethane compound useful for imparting durable water repellency and optionally stain release to textiles. These partially fluorinated urethanes provide increased durable water repellency and optionally stain release to textiles and are comparable to several fluorinated water repellent compounds.

The present invention further comprises a compound for imparting water repellency and optionally stain release to substrates wherein the compound is prepared by the process comprising:

reacting (a) at least one isocyanate group-containing compound selected from diisocyanate and polyisocyanate, or mixture thereof; (b) at least one isocyanate-reactive compound selected from the group consisting of a cyclic or acyclic sugar alcohol which is substituted with at least one $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently $-H$, or a linear or branched alkyl group having 6 to 30 carbons optionally comprising at least 1 unsaturated bond, or mixtures thereof; and (c) at least one fluorinated isocyanate-reactive compound selected from a fluorinated alcohol, fluorinated thiol, or fluorinated amine.

In another embodiment, the invention relates to a method of preparing a compound comprising: reacting (a) at least one isocyanate group-containing compound selected from diisocyanate and polyisocyanate, or mixture thereof; (b) at least one isocyanate-reactive compound selected from the group consisting of a cyclic or acyclic sugar alcohol which is substituted with at least one $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof, where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently $-H$, or a linear or branched alkyl group having 6 to 30 carbons optionally comprising at least 1 unsaturated bond, or mixtures thereof; and (c) at least one fluorinated isocyanate-reactive compound selected from a fluorinated alcohol, fluorinated thiol, or fluorinated amine.

The invention also relates to a method of providing a surface effect to a fibrous substrate comprising contacting a fibrous substrate with a compound comprising the reaction product of reagents comprising: (a) at least one isocyanate group-containing compound selected from diisocyanate, polyisocyanate, or mixture thereof; (b) at least one isocyanate-reactive compound selected from the group consisting of a cyclic or acyclic sugar alcohol which is substituted with at least one $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof, where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently $-H$, or a linear or branched alkyl group having 6 to 30 carbons optionally comprising at least 1 unsaturated bond, or mixtures thereof; and (c) at least one fluorinated isocyanate-reactive compound selected from a fluorinated alcohol, fluorinated thiol, or fluorinated amine.

The compound may further comprise additional reactants such as an additional organic compound and/or water. Water can be used to cross-link unreacted isocyanates to create urea linkages.

DETAILED DESCRIPTION OF INVENTION

Herein all trademarks are designated with capital letters.

The present invention provides a compound for imparting water repellency and optionally stain release to fibrous substrates. The resulting compounds provide enhanced performance and durability of water repellency to treated substrates compared to traditional non-fluorinated commercially available treatment agents. The starting materials of the present invention can be derived from bio-source materials.

The present invention relates to a compound comprising the reaction product of reagents comprising: (a) at least one isocyanate group-containing compound selected from diisocyanate, polyisocyanate, or mixture thereof; (b) at least one isocyanate-reactive compound selected from the group consisting of a cyclic or acyclic sugar alcohol which is substituted with at least one —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof, where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; and (c) at least one fluorinated isocyanate-reactive compound selected from a fluorinated alcohol, fluorinated thiol, or fluorinated amine.

Suitable isocyanate group-containing compounds can be any diisocyanate or polyisocyanate having predominately two or more isocyanate groups. For example, hexamethylene diisocyanate homopolymers are suitable for use herein and are commercially available. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers, where Q is a trivalent linear alkylene having an isocyanurate group. Preferred is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate, where Q is a trivalent polyaromatic ring structure having a cyclized isocyanate group. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of Formulas (Ia), (Ib), (Ic), (Id), and (Ie):

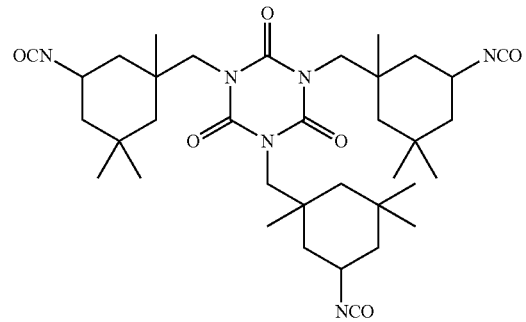
(Ia)

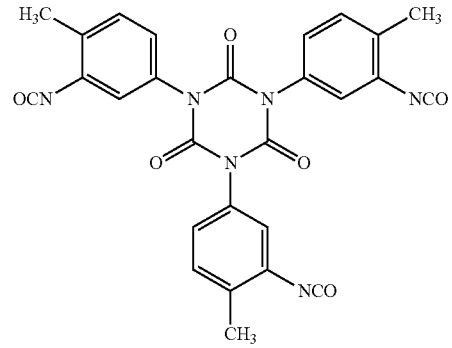
(Ib)

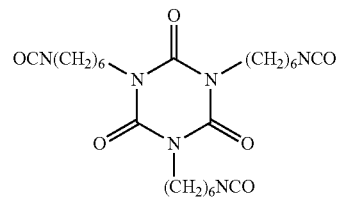
(Ic)

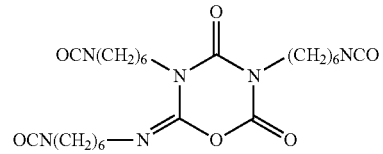
(Id)

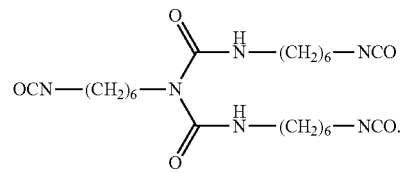
(Ie)

The diisocyanate trimers (IIIa-d) are available, for instance as DESMODUR Z4470, DESMODUR IL, DESMODUR N-3300, and DESMODUR XP2410, respectively, from Bayer Corporation.

The least one isocyanate-reactive compound (b) comprises a cyclic or acyclic sugar alcohol which is substituted with at least one —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof. The reaction of the substituted sugar alcohol with the isocyanate component will yield a urethane linkage with residues of the substituted sugar alcohol and of the isocyanate. The term "residue of a cyclic or acyclic sugar alcohol" is herein defined as the molecular structure of a cyclic or acyclic sugar alcohol when one or more H atoms has been removed from a hydroxyl group —OH. The urethane functional group may be formed by any suitable method, including by reacting a diisocyanate or polyisocyanate with a cyclic or acyclic sugar alcohol which is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CHO)$_m$C(O)$R^1$; or mixtures thereof. The term "residue of an isocyanate, diisocyanate, or polyisocyanate" is herein defined as the molecular structure of an isocyanate, diisocyanate, or polyisocyanate where all isocyanate groups NCO have been removed.

The cyclic or acyclic sugar alcohol is selected from a saccharide, reduced sugar, aminosaccharide, aldonic acid, or aldonic acid lactone, and is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof. The substituted sugar alcohols may be formed by reacting (b') at least one sugar alcohol with (b") at least one fatty acid or alkoxylated fatty acid. This step can be performed by any suitable esterification process. For example, U.S. Pat. No. 3,297,290 describes the synthesis of sorbitan esters, where an anhydro sorbitol is reacted with a fatty acid in the presence of an alkaline catalyst. Examples of such sugar alcohols (b') include but are not limited to aldoses and ketoses such as those compounds derived from tetroses, pentoses, hexoses, and heptoses. Specific examples include glucose, glyceraldehyde, erythrose, arabinose, ribose, arabinose, allose, altrose, mannose, xylose, lyxose, gulose, galactose, talose, fructose, ribulose, mannoheptulose, sedoheptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof. The cyclic or acyclic sugar alcohols used in this invention are substituted with at least one —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$ by any suitable method, including esterification with a fatty acid, to form hydroxy-functional substituted sugar alcohols. Suitable fatty acids (b") include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, and mixtures thereof. In one embodiment, $R^1$ is a linear or branched alkyl group having 7 to 29 carbons, in another embodiment, $R^1$ is a linear or branched alkyl group having 9 to 29 carbons, and in another embodiment, $R^1$ is a linear or branched alkyl group having 11 to 21 carbons. In one embodiment, $R^2$ is a linear or branched alkyl group having 8 to 30 carbons, in another embodiment, $R^2$ is a linear or branched alkyl group having 10 to 30 carbons, and in another embodiment, $R^2$ is a linear or branched alkyl group having 12 to 22 carbons.

In one embodiment, the isocyanate-reactive compound (b) is selected from Formulas (IIa), (IIb), or (IIc):

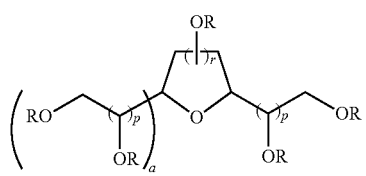
(IIa)

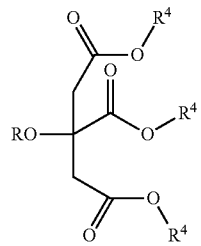
(IIb)

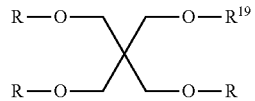
(IIc)

wherein each R is independently —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each n is independently 0 to 20; each m is independently 0 to 20; m+n is greater than 0; r is 1 to 3; a is 0 or 1; p is independently 0 to 2; provided that a is 0 when r is 3; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or mixtures thereof, provided when Formula (IIa) is chosen, then at least one R is —H and at least one R is a —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each $R^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; provided when Formula (IIb) is chosen, then at least one R or $R^4$ is —H; and at least one R or $R^4$ is a linear or branched alkyl group optionally comprising at least 1 unsaturated bond, or combinations thereof; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; and each $R^{19}$ is —H, —C(O)$R^1$, or —CH$_2$C[CH$_2$OR]3, provided when Formula (IIc) is chosen, then at least one $R^{19}$ or R is —H; and at least one $R^{19}$ or R is —C(O)$R^1$, —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$. In Formulas (IIa), (IIb), or (IIc), the —(CH$_2$CH$_2$O)— represents oxyethylene groups (EO) and —(CH(CH$_3$)CH$_2$O)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

Where the isocyanate-reactive compound (b) is from Formula (IIa), any suitable substituted reduced sugar alcohol may be employed, including esters of 1,4-sorbitan, esters of 2,5-sorbitan, and esters of 3,6-sorbitan. In one embodiment, the isocyanate-reactive compound (b) is selected from Formula (IIa) to be Formula (IIa'):

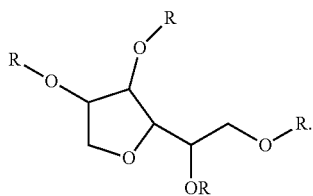
(IIa')

In one embodiment, at least one R is H, and at least one R is —C(O)R$^1$ or R$^1$. Compounds used to form residues of Formula (IIa'), having at least one R as —H and at least one R selected from —C(O)R$^1$, are commonly known as alkyl sorbitans. These sorbitans can be mono-substituted, di-substituted, or tri-substituted with —C(O)R$^1$. It is known that commercially available sorbitans, such as SPAN, contain a mixture of the various sorbitans ranging from where each R is H (un-substituted), and sorbitans where each R is —C(O)R$^1$ (fully substituted); wherein R$^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least one R is —C(O)R$^1$, and R$^1$ is a linear or branched alkyl group having 5 to 29 carbons. In another embodiment, R$^1$ is a linear or branched alkyl group having 7 to 21 carbons, and in a third embodiment, R$^1$ is a linear or branched alkyl group having 11 to 21 carbons. Preferred compounds used to form these residues include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include mono-, di-, and tri-substituted sorbitan stearates or sorbitan behenins.

Optionally, R$^1$ is a linear or branched alkyl group having 5 to 29 carbons comprising at least 1 unsaturated bond. Examples of compounds used to form residues of Formula (IIa') wherein at least one R is selected from —C(O)R$^1$; and R$^1$ contains least 1 unsaturated bond, include, but are not limited to, sorbitan trioleate (i.e., wherein R$^1$ is —C$_7$H$_{14}$CH=CHC$_8$H$_{17}$). Other examples include but are not limited to mono-, di-, and tri-substituted sorbitans derived from palmitoleic acid, lineolic acid, arachidonic acid, and erucic acid.

In one embodiment, Formula (IIa') is employed, wherein R is further limited to independently a —H; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$. In this embodiment, at least one R is independently —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$. In one aspect, R$^2$ is H and m is a positive integer such that the substitution is hydrophobic. Compounds of Formula (IIa'), wherein at least one R is —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups R$^1$ or R$^2$. It is known that commercially available polysorbates, contain a mixture of the various polysorbates ranging from where each R$^2$ is H (unsubsituted), and polysorbates where each R$^1$ is a linear or branched alkyl group having 5 to 29 carbons (fully substituted); and mixtures of various substitutions thereof. Examples of compounds of Formula (IIa') include polysorbates such as polysorbate tristearate, and polysorbate monostearate. Examples of compounds of Formula (IIa') wherein m+n is greater than 0, and wherein R$^1$ comprises at least 1 unsaturated bond, include but are not limited to, polysorbate trioleate (wherein R$^1$ is C$_7$H$_{14}$CH=CHC$_8$H$_{17}$), are sold commercially under the name Polysorbate 80. Reagents may include mixtures of compounds having various values for R, R$^1$, and R$^2$, and may also include mixtures of compounds where R$^1$ comprises at least one unsaturated bond with compounds where R$^1$ is fully saturated.

In one embodiment, the isocyanate-reactive compound (b) is selected from Formula (IIb). Compounds of Formula (IIb) are known as alkyl citrates. These citrates can be present as a mono-substituted, di-substituted, or tri-substituted compound with alkyl groups. It is known that commercially available citrates contain a mixture of the various citrates as well as citric acids from where R and each R$^4$ is —H, ranging to citrates where each R$^4$ is a linear or branched alkyl group having 6 to 30 carbons optionally comprising at least 1 unsaturated bond; and mixtures of various substitutions thereof. Mixtures of citrates having various values for R$^1$, R$^2$, and R$^4$ may be used, and may also include mixtures of compounds where R$^1$ comprises at least one unsaturated bond with compounds where R$^1$ is fully saturated. Alkyl citrates are also commercially available wherein m+n is greater than 0, R$^4$ is —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$ and are present in the various substitutions from wherein R and each R$^2$ is H to wherein each R$^1$ and/or R$^2$ is a linear or branched alkyl group having 5 to 30 carbons optionally comprising at least 1 unsaturated bond. Examples of compounds of Formula (IIb) include, but are not limited to, trialkyl citrates.

In one embodiment, the isocyanate-reactive compound (b) is selected from Formula (IIc). Compounds of Formula (IIc) are known as pentaerythriol esters. These pentaerythriol esters can be present as a mono-substituted, di-substituted, or tri-substituted with alkyl groups. It is known that commercially available pentaerythriol esters contain a mixture of the various pentaerythriol esters where R$^{19}$ and each R is —H, ranging to pentaerythriol esters where each R is —C(O)R$^1$, and R$^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where R$^1$ comprises at least one unsaturated bond with compounds where R$^1$ is fully saturated.

Compounds of Formulas (IIa), (IIb), and (IIc) can all be bio-based derived. By "bio-based derived", it is meant that at least 10% of the material can be produced from non-crude oil sources, such as plants, other vegetation, and tallow. In one embodiment, the substituted sugar alcohol is from about 10% to 100% bio-based derived. In one embodiment, the substituted sugar alcohol is from about 35% to 100% bio-based derived. In another embodiment, the substituted sugar alcohol is from about 50% to 100% bio-based derived. In one embodiment, the substituted sugar alcohol is from about 75% to 100% bio-based derived. In one embodiment, the substituted sugar alcohol is 100% bio-based derived. The average OH value of the substituted sugar alcohol compounds can range from just greater than 0 to about 230. In one embodiment, the average OH value is from about 10 to about 175, and in another embodiment, the average OH value is from about 25 to about 140.

In one embodiment, the at least one fluorinated isocyanate-reactive compound (c) is at least one compound of the formula $$R_f\text{-}A_x\text{-}Z\text{—}H \quad \quad (III)$$

wherein $R_f$ is a C1 to C20 linear or branched perfluoroalkyl optionally interrupted by one, two or three ether oxygen atoms;

X is 0 or 1;

A is $(CH_2)_k$, $(CH_2CF_2)_m(CH_2)_n$, $(CH_2)_oSO_2N(CH_3)(CH_2)_p$, $O(CF_2)_2(CH_2)_r$, or $OCHFCF_2OE$;

Z is O, S, or NH;

m is 1 to 4;

k, n, o, p, and r are each independently 1 to 20; and

E is a $C_2$ to $C_{20}$ linear or branched alkyl group optionally interrupted by oxygen, sulfur, or nitrogen atoms; a cyclic alkyl group, or a $C_6$ to $C_{10}$ aryl group.

In a further embodiment, $R_f$ is an uninterrupted linear $C_2$ to $C_6$ perfluoroalkyl, and x is 1.

In one embodiment reactive compound (c) can be a fluorinated alcohol which may be used to improve stain release properties of the end product. Any suitable fluorinated alcohol may be used. The fluorinated alcohol having Formula (II) where Z is 0 and where $R_f$ is a $C_1$ to $C_{20}$ perfluoroalkyl group optionally interrupted by $CH_2$, $CH_2CH_2$, $SO_2N$, CFH, S, or O; and A is a direct bond or a $C_1$ to $C_6$ alkylene group. $R_f$ and A may be linear or branched. In one aspect, the fluorinated alcohol is a telomer-based alcohol, where $R_f$ is a linear perfluoroalkyl group and A is $CH_2CH_2$. In one aspect, $R_f$ is a $C_2$ to $C_6$ linear or branched perfluoroalkyl group. Specific examples of fluorinated alcohols include but are not limited to $R_fOH$, $R_fCH_2CH_2OH$, $R_fSO_2NHCH_2CH_2OH$, $R_fCH_2CH_2SCH_2CH_2OH$, $R_fCH_2CH_2CF_2CF_2CH_2CH_2OH$, $R_fCH_2CH_2(CF_2CF_2CH_2CH_2)_2OH$, $R_fCH_2CF_2CH_2CH_2OH$, $R_fCH_2CF_2CH_2CF_2CH_2CH_2OH$, $R_fOCF_2CF_2CH_2CH_2OH$, $R_fCH_2OCH_2CH_2OH$, $R_fCHFCH_2CH_2OH$, $R_fCH_2O(CH_2)_6OH$, $(CF_3)_2CFCH_2CH_2OH$, $(CF_3)_2CFCH_2CH_2CH_2OH$, $R_fCH_2CH_2SO_2NHCH_2CH_2OH$, $R_fCH_2CH_2SO_2N(CH_3)CH_2CH_2OH$, $R_fCH_2CH_2SO_2N(CH_2CH_3)CH_2CH_2OH$, $R\text{—}(CF(CF_3)CF_2O)_yCH_2OH$, $CF_2\text{=}CFOCF_2CF(CF_3)OCF_2CF_2CH_2OH$, or $R_fCH_2OC_2F_4CH_2OCH_2CH_2OH$.

In a further embodiment compound (c) can be a fluorinated thiol which may be used to improve stain release properties of the end product. Any suitable fluorinated thiol may be used. The fluorinated thiol having Formula (II) where Z is S and where $R_f$ is chosen from a $C_2$ to $C_{20}$ perfluoroalkyl group provided that: i) one fluorine atom of the perfluoroalkyl can be optionally interrupted by at least one oxygen, methylene, or ethylene; and A is chosen from the group consisting of $C_2$-$C_{12}$ hydrocarbylene optionally interrupted by at least one divalent organic group. $R_f$ and A may be linear or branched.

In a further compound (c) can be a fluorinated amine which may be used to improve stain release properties of the end product. Any suitable fluorinated amine may be used. The fluorinated amine having Formula (II) where Z is NH and where $R_f$ is a fluorocarbon or perfluorocarbon having 1 to 20 carbon atoms, and A is a connecting di-radical $C_1$ to $C_{20}$ alkyl, $C_6$ to $C_{20}$ aryl, O—$R^1$—S(O)$_k$—$R^{1'}$, $R^1$—S(O)$_k$—$R^{1'}$, $R^1$—$NR^2$—$R^{1'}$, $C_1$ to $C_{20}$ substituted alkyl, $C_6$ to $C_{20}$ substituted aryl, or a combination thereof, k=0 or 1; wherein $R^1$ or $R^{1'}$ is independently $C_1$ to $C_{10}$ alkyl, $C_6$ to $C_{10}$ aryl, $C_1$ to $C_{10}$ substituted alkyl, $C_6$ to $C_{10}$ substituted aryl, or a combination thereof, and wherein $R^2$ is H, $C_1$ to $C_{10}$ alkyl, $C_6$ to $C_{10}$ aryl, $C_1$ to $C_{10}$ substituted alkyl, or $C_6$ to $C_{10}$ substituted aryl. A, $R^1$, $R^{1'}$, or $R^2$ can also have one or more fluorine or other halogen atoms, or one or more fluorocarbon or perfluorocarbon groups that can be the same as or different from the $R_f$, as substitutes for one or more hydrogen atoms.

Examples of suitable fluorinated amines are polyfluorinated or perfluorinated methylamine, dimethylamine, trimethylamine, ethylamine, diethylamine, triethylamine, ethylmethylamine, ethyldimethylamine, diethylmethyl amine, propylamine, dipropylamine, tripropylamine, butylamine, dibutylamine, tributylamine, pentylamine, dipentylamine, tripentylamine, hexylamine, dihexylamine, trihexyl amine, heptylamine, diheptylamine, triheptylamine, octylamine, dioctylamine, trioctylamine, nonylamine, dinonylamine, trinonylamine, decylamine, didecylamine, tridecylamine, undecylamine, diundecylamine, triundecylamine, dodecylamine, didodecylamine or tridodecylamine. In connection with these per- or polyfluorinated alkyl, dialkyl or trialkyl amines, it is preferred for at least 40%, more preferably at least 55% and most preferably 70% of the hydrogen atoms in the amine to be replaced with fluorine atoms. Where only some of the hydrogen atoms are replaced with fluorine atoms, it is preferred for the remaining hydrogen atoms to be as close as possible to the nitrogen atom. Further examples of fluorinated amines are perfluorotripentylamine, 3,3,4,4,5,5,6,6,7,7,8,8,9,9,10,10,10-heptadecafluoro-I-decylamine (also known as IH,IH,-2H,2H-perfluorodecylamine) or 2,2,3,3,4,4,5,5,6,6,7,7,8,8,8-pentadecafluoro-I-octylamine (also known as IH,IH-perfluorooctylamine).

In one embodiment, the reagents used to form the urethane compound further comprise at least one additional isocyanate-reactive compound (d) selected from water, organic compounds of Formula (IVa)

$$R^5\text{-D} \quad \quad (IVa),$$ or organic compounds of Formula (IVb)

$$R^3\text{—}(OCH_2CH(OR^3)CH_2)_z\text{—}OR^3 \quad \quad (IVb),$$

or mixtures thereof, wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy-functional linear or branched organosiloxane, an amine-functional linear or branched organosiloxane, a thiol-functional $C_1$ to $C_{30}$ linear or branched alkyl, an amine-functional $C_1$ to $C_{30}$ linear or branched alkyl,

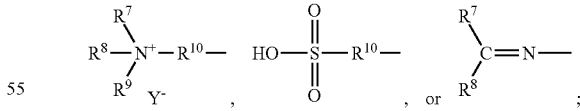

D is selected from —N($R^{12}$)H, —OH, —COOH, —SH, —O—$(CH_2CH_2O)_s(CH(CH_3CH_2O)_t$—H, or (C(O)—O—$(CH_2CH_2O)_s(CH(CH_3)CH_2O)_tH$; $R^3$ is independently selected from —H; —$R^{18}$; or —C(O)$R^{18}$, provided that at least one $R^3$ is —H; $R^{12}$ is —H or a monovalent $C_1$ to $C_6$ alkyl group; $R^7$, $R^8$, and $R^9$ are each independently, —H, —$C_1$ to $C_6$ alkyl, or combinations thereof; $R^{10}$ is a divalent alkyl group of 1 to 20 carbons; $R^{18}$ is independently a linear or branched alkyl group having 5 to 29 carbons optionally comprising at least 1 unsaturated bond; z is 1 to 15; Y is Cl;

s is an integer of 0 to 50; t is an integer of 0 to 50; and s+t is greater than 0. The term "branched", as used herein, means that the functional chain can be branched at any point, for example as a quarternary substituted carbon, and can contain any number of branched substitutions.

In one embodiment, the invention is drawn to a method of preparing a compound comprising reacting (a) at least one isocyanate group-containing compound selected from diisocyanate, polyisocyanate, or mixture thereof; (b) at least one isocyanate-reactive compound selected from the group consisting of a cyclic or acyclic sugar alcohol which is substituted with at least one —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and mixtures of a fluorinated alcohol and a cyclic or acyclic sugar alcohol which is substituted with at least one —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and (c) at least one fluorinated isocyanate-reactive compound selected from a fluorinated alcohol, fluorinated thiol, or fluorinated amine; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof.

The reaction product can be made in one step, including those compounds made with mixtures of compounds (b). In one embodiment, if more than one compound (b) is present, then the synthesis can be completed sequentially. A sequential addition is especially useful when employing substituted sugar alcohols with high OH numbers, or when using polyfunctional compounds of Formulas (IVa) or (IVb).

This reaction is typically conducted by charging a reaction vessel with the diisocyanate and/or polyisocyanate, the at least one isocyanate-reactive compound (b), and the fluorinated isocyanate-reactive compound (c). The order of reagent addition is not critical, but if water is used, the water should be added after the isocyanate(s) and compounds (b) and (c).

The specific weight of the reactants charged is based on their equivalent weights and on the working capacity of the reaction vessel, and is adjusted so that substituted sugar alcohol will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment the mixture is allowed to react for several more hours or until all of the isocyanate has been reacted. Additional water can then be added along with surfactants, if desired, to the urethane compounds and stirred until thoroughly mixed. Following a homogenization or sonification step, the organic solvent can be removed by evaporation at reduced pressure, and the remaining aqueous solution or dispersion of the compound of the present invention can be used as is or subjected to further processing. The aqueous composition comprises at least one compound of the present invention, a water carrier, and optionally one or more surfactants.

It will be apparent to one skilled in the art that many changes to any or all of the above procedures can also be used to optimize the reaction conditions for obtaining maximum yield, productivity, or product quality.

The composition of the present invention as described above is contacted with the fibrous substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. The composition is also contacted by use of a beck dyeing procedure, continuous dyeing procedure or thread-line application.

The composition of the present invention is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, cleanability and similar effects. Such components may be fluorinated or non-fluorinated.

One or more of such treating agents or finishes are applied to the substrate before, after, or simultaneously with the composition of the present invention. For example, for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes are also optionally present, such as surfactants, pH adjusters, cross linkers, wetting agents, wax extenders, and other additives known by those skilled in the art. Suitable surfactants include anionic, cationic, nonionic, N-oxides and amphoteric surfactants. Examples of such additives include processing aids, foaming agents, lubricants, anti-stains, and the like. The composition is applied at a manufacturing facility, retailer location, or prior to installation and use, or at a consumer location.

Optionally, a blocked isocyanate is added with the composition of the present invention to further promote durability (i.e., as a blended composition). An example of a suitable blocked isocyanate to use in the present invention is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

The optimal treatment for a given substrate depends on (1) the characteristics of the compound or composition of the present invention, (2) the characteristics of the surface of the substrate, (3) the amount of compound or composition of the present invention applied to the surface, (4) the method of application of the compound or composition of the present invention onto the surface, and many other factors. Some compounds or compositions of the present invention work well on many different substrates and are repellent to water. Dispersions prepared from compounds of the present invention are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In another embodiment, the present invention is a fibrous substrate having applied to its surface a compound as disclosed above. The fibrous substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have excellent water repellency and optionally stain release properties.

The compounds of the present invention are useful to provide excellent stain release to treated substrates and compositions which are comparable to commercially available fluorinated treating agents.

Test Methods and Materials

MPEG 750 is defined as poly(ethylene glycol) methyl ether 750 and is commercially available from Sigma-Aldrich, St. Louis, Mo.

Sorbitan tristearate is commercially available from Croda, East Yorkshire, England, or DuPont Nutrition & Health, Copenhagen, Denmark.

Sorbitan tribehenin 88 and STS30 sorbitan tristearate were obtained from Danisco.

DESMODUR N-100 and DESMODUR N3300 were obtained from Bayer Corporation, Pittsburgh, Pa.

SPAN 60 sorbitan monostearate, SPAN 85 sorbitan trioleate, and TWEEN 65 polyoxyethylenesorbitan tristearate, were obtained from Croda, East Yorkshire, England.

Decaglycerol decastearate was purchased from Nikkol Chemical Co. (DECAGLYN 10-SV).

KRYTOX KFA-220AL alcohol was obtained from DuPont Co., Wilmington, Del.

The following test methods and materials were used in the examples herein.

Test Method 1—Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of

TABLE 1

Standard Test Liquids

| Water Repellency Rating Number | Composition Vol. %, Isopropyl Alcohol | Composition, Vol. % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 2—Oil Repellency

The treated fabric samples were tested for oil repellency by a modification of AATCC standard Test Method No. 118, conducted as follows: A fabric sample, treated with an aqueous dispersion of polymer, was conditioned for a minimum of 15 hours at 23° C.+65% relative humidity prior to testing. A series of organic liquids, identified below in Table 2, were then applied drop wise to the fabric samples. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids resulted in two of the three drops failing to remain spherical to hemispherical, or wetting or wicking occurred.

The oil repellency rating of the fabric was the highest numbered test liquid for which two of the three drops remained spherical to hemispherical, with no wicking for 30 seconds. Ratings of 0.5 increments were determined by subtracting one-half from the number in Table 2 for borderline passing of the next liquid. Higher ratings indicate greater repellency. The composition of oil repellency test liquids is shown in the Table 2.

TABLE 2

| Oil Repellency Test Liquids | |
| --- | --- |
| Oil Repellency Rating | Test Solution |
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |

Test Method 3—Spray Test

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 4—Stain Release

This test measures the ability of a fabric to release oily stains during home laundering.

Treated textiles are placed on a flat surface. Using an eyedropper, 5 drops of MAZOLA Corn Oil or mineral oil (0.2 mL) were placed onto the fabric to form 1 drop of oil. A weight (5 lb, 2.27 kg) is placed on top of the oil drop with a piece of glassine paper separating the oil drop. The weight was left in place for 60 seconds. After 60 seconds, the weight and glassine paper are removed. The textiles samples were then washed using an automatic washer high for 12 minutes with AATCC 1993 Standard Reference Detergent WOB12 or granular detergent (100 g). The textiles were then dried on high for 45-50 minutes. The textiles were then evaluated for residual stain of 1 to 5, 1 having the largest residual stain remaining and 5 being no stain residual was visible. In the examples below, stain release ratings of corn oil are designated by the term "Corn Oil", and stain release ratings of mineral oil are designated by the term "Mineral Oil".

Test Method 5—Fabric Treatment

The fabrics treated in this study were 100% by weight khaki cotton twill available from SDL Atlas Textile Testing Solutions, Rock Hill, S.C. 29732 and 100% by weight red polyester fabric available from L. Michael OY, Finland. The fabric was treated with the aqueous dispersions various emulsion polymer using a conventional pad bath (dipping) process. The prepared concentrated dispersion of the polymer emulsions were diluted with deionized water to achieve a pad bath having 60 g/L or 100 g/L of the final emulsion in the bath.

For the following examples, amounts of reagents are given in percent by weight, based on the total amount of reactive agents that compose the final compound. Examples of the compounds and compositions of the instant invention can be made from various isocyanates (a), compounds (b), compounds (c), or mixtures thereof, as demonstrated in the examples below. The present invention is not to be limited by the examples.

EXAMPLES 1-10

The following general procedure was followed to produce the samples for Examples 1-10. Amounts of each compound are shown in Table 2.

In a small vial equipped with a stir bar and nitrogen flow was added compound (b), compound (c) and 4-methyl-2-pentanone (MIBK, 150 g) and heated to 55° C. Once the temperature was stabilized, compound (a) was added and the solution was heated to 80° C. Next, catalyst was added and the temperature was increased to 95° C. After 4 hours, n-butanol was added. The temperature was then decreased to 80° C. and held overnight. The next morning, products were tested for the presence of active isocyanates and then applied to cotton and polyester at 100 g/L.

TABLE 2

Compositions of Examples 1 to 10.

| Ex. | Isocyanate (a) DESMO-DUR N100 (Wt. %) | Fluorinated reagent (c) 1H,1H,2H,2H - Perfluoro-hexanol (Wt. %) | Sugar Alcohol (b) Reagent | Wt. % | Additional Monomer N-Butanol (Wt. %) |
| --- | --- | --- | --- | --- | --- |
| 1 | 23.5 | 8.1 | sorbitan tristearate | 66.9 | 1.5 |
| 2 | 33.6 | 32.8 | sorbitan tristerate | 30.9 | 2.7 |
| 3 | 27.7 | 27.9 | TWEEN 65 | 42.5 | 1.9 |
| 4 | 30.9 | 31.4 | sorbitan tribehenin | 35.4 | 2.3 |
| 5 | 31.3 | 31.4 | sorbitan trioleate | 35.3 | 2.0 |
| 6 | 16.3 | 5.6 | TWEEN 65 | 77.0 | 1.1 |
| 7 | 20.8 | 6.7 | sorbitan tribehenin | 71.0 | 1.5 |
| 8 | 20.3 | 7.7 | sorbitan trioleate | 70.8 | 1.2 |
| 9 | 28.1 | 27.7 | decaglycerol decastearate | 41.9 | 2.3 |
| 10 | 17.0 | 5.6 | decaglycerol decastearate | 76.2 | 1.2 |

TABLE 3

Performance Data of Examples 1-10

| | Cotton | | | Polyester | | |
| --- | --- | --- | --- | --- | --- | --- |
| | Water Drop | Oil Drop | Spray | Water Drop | Oil Drop | Spray |
| Ex. 1 | 4 | 0 | 70 | 3 | 0 | 0 |
| Ex. 2 | 4 | 3 | 70 | 3 | 2 | 60 |
| Ex. 3 | 3 | 2 | 75 | 3 | 2 | 60 |
| Ex. 4 | 4 | 4 | 75 | 3 | 2 | 60 |
| Ex. 5 | 3 | 4 | 70 | 3 | 2 | 60 |
| Ex. 6 | 1 | 0 | 50 | 3 | 0 | 25 |
| Ex. 7 | 3 | 0 | 75 | 3 | 0 | 70 |
| Ex. 8 | 3 | 2 | 70 | 2 | 2 | 0 |
| Ex. 9 | 4 | 3 | 70 | 3 | 2 | 0 |
| Ex. 10 | 3 | 0 | 80 | 3 | 0 | 0 |

EXAMPLES 11 to 27

Examples 11 to 27 follow the procedures of Examples 1-10, using the compounds shown in Table 4. Examples 11 to 27 were applied to cotton and polyester textiles at 100 g/L. The fabrics were tested according to the test methods described above. Performance data is shown in Table 5.

TABLE 4

Compositions of Examples 11 to 27

| Ex. | Isocyanate (a) DESMODUR N100 (Wt. %) | Sugar Alcohol (b) Sorbitan tristerate (Wt. %) | Fluorinated reagent (c) Reagent | Wt. % | Additional Monomer N-Butanol (Wt. %) |
|---|---|---|---|---|---|
| 11 | 23.9 | 64.6 | Perfluorobutylthio-ether ethyl alcohol | 10.1 | 1.4 |
| 12 | 23.8 | 64.5 | C4,1-VDF Alcohol | 10.2 | 1.4 |
| 13 | 23.9 | 64.6 | Perfluorobutylthio-ether ethyl amine | 10.2 | 1.4 |
| 14 | 23.8 | 64.5 | PPVE alcohol | 10.3 | 1.4 |
| 15 | 23.2 | 62.7 | Perfluorohexylthio-ether ethyl alcohol | 12.9 | 1.4 |
| 16 | 23.2 | 62.7 | Perfluorobutylthio-ether ethyl amine | 12.8 | 1.4 |
| 17 | 15.7 | 42.4 | KRYTOX KFA-220AL | 41.0 | 0.9 |
| 18 | 23.6 | 63.8 | Perfluorohexylethyl amine | 11.2 | 1.4 |
| 19 | 25.2 | 68.3 | 1-Butanol, 3,4,4,4-tetrafluoro-3-(trifluoromethyl) | 5.0 | 1.5 |
| 20 | 25.2 | 68.1 | 1-pentanol, 4,5,5,5-tetrafluoro-4-(trifluoromethyl) | 5.3 | 1.5 |
| 21 | 23.8 | 64.3 | N-methyl-RF6-sulfonamide | 10.6 | 1.4 |
| 22 | 23.7 | 64.1 | N-ethyl-RF6-sulfonamide | 10.8 | 1.4 |
| 23 | 24.0 | 64.9 | C6-triazole alcohol | 9.8 | 1.4 |
| 24 | 24.2 | 65.6 | Fraction 6 EVE alcohol | 8.8 | 1.4 |
| 25 | 24.9 | 67.3 | 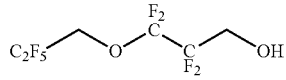 | 6.4 | 1.5 |
| 26 | 24.6 | 66.5 | 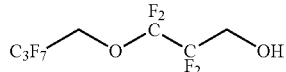 | 7.4 | 1.4 |
| 27 | 22.7 | 61.4 | ETFE Alcohol | 14.6 | 1.3 |

TABLE 5

Performance Data of Examples 11 to 27

| | Cotton | | | Polyester | | |
|---|---|---|---|---|---|---|
| | Water Drop | Oil Drop | Spray | Water Drop | Oil Drop | Spray |
| Ex. 11 | 3 | 0 | 75 | 3 | 0 | 80 |
| Ex. 12 | 3 | 2 | 70 | 3 | 1 | 70 |
| Ex. 13 | 3 | 0 | 70 | 2 | 0 | 60 |
| Ex. 14 | 3 | 3 | 70 | 3 | 2 | 75 |
| Ex. 15 | 4 | 1 | 75 | 5 | 1 | 75 |
| Ex. 16 | 5 | 6 | 80 | 5 | 2 | 80 |
| Ex. 17 | 5 | 3 | 95 | 4 | 2 | 95 |
| Ex. 18 | 3 | 1 | 70 | 3 | 0 | 60 |
| Ex. 19 | 3 | 1 | 85 | 3 | 0 | 100 |
| Ex. 20 | 3 | 1 | 90 | 3 | 0 | 90 |
| Ex. 21 | 4 | 1 | 90 | 3 | 0 | 90 |
| Ex. 22 | 2 | 1 | 60 | 2 | 2 | 60 |
| Ex. 23 | 3 | 2 | 70 | 3 | 1 | 80 |
| Ex. 24 | 3 | 0 | 75 | 3 | 0 | 75 |
| Ex. 25 | 3 | 0 | 75 | 2 | 0 | 70 |
| Ex. 26 | 3 | 0 | 90 | 3 | 0 | 90 |
| Ex. 27 | 3 | 1 | 80 | 3 | 1 | 80 |

EXAMPLES 28 to 32

The following general procedure was followed to produce the samples for Examples 32 to 36.

Into a 4-neck round bottom stirrer, thermocouple and condenser was added the compound (b), compound (c), sodium carbonate and MIBK and heated to 55° C. Once the temperature was stabilized, compound (a) was added and the solution was heated to 800 C. Next, Fe3Cl catalyst was added and the temperature was increased to 95 C. After 6 hours, n-butanol was added to the reaction mixture and the temperature was lowered to 80 C and held overnight.

In the morning an aqueous surfactant solution containing water (122.8 grams), acetic acid (0.86 gram), Chemdix S (1.23 grams), Ethal LA-4 (1.61 grams) and dipropylene glycol (13.92 grams) was prepared. The solution was heated to 65 C. The solution was then slowly added to the reactor producing a milky dispersion. The mixture was immersion blended (2 minutes), homogenized at 6000 psi, and then distilled under reduced pressure to remove the solvent. The dispersion was then cooled and filtered.

Products were then applied to cotton and polyester fabrics at 100 g/L. Performance data for the tested fabrics are shown in Table 7.

TABLE 6

Compositions of Examples 28-32

| Ex. | Isocyanate (a) DESMO-DUR N100 (Wt. %) | Fluorinated reagent (c) 1H,1H,2H,2H-perfluorooctanol (Wt. %) | Sugar Alcohol (b) Reagent | Wt. % | Additional Monomer N-Butanol (Wt. %) |
|---|---|---|---|---|---|
| 28 | 21.3 | 0.4  | STS30 | 77.0 | 1.2 |
| 29 | 22.2 | 4.2  | STS30 | 72.4 | 1.2 |
| 30 | 26.8 | 25.4 | STS30 | 46.3 | 1.6 |
| 31 | 30.8 | 43.8 | STS30 | 23.6 | 1.8 |
| 32 | 23.7 | 11.2 | STS30 | 63.7 | 1.4 |

TABLE 7

Performance Data of Examples 28 to 32

|  | Cotton | | | Polyester | | |
|---|---|---|---|---|---|---|
|  | Water Drop | Oil Drop | Spray | Water Drop | Oil Drop | Spray |
| Ex. 28 | 3 | 0 | 100 | 3 | 0 | 100 |
| Ex. 29 | 3 | 0 | 100 | 3 | 0 | 100 |
| Ex. 30 | 3 | 5 | 75  | 4 | 4 | 80  |
| Ex. 31 | 3 | 5 | 80  | 4 | 2 | 80  |
| Ex. 32 | 3 | 2 | 75  | 4 | 2 | 80  |

EXAMPLES 33 to 36

Examples 33 to 36 follow the procedures of Examples 1-10. Amounts of each compound are shown in Table 8. Performance data is shown in Table 8.

TABLE 8

Compositions of Examples 33 to 36

| Ex. | Isocyanate (a) DESMO-DUR N100 (Wt. %) | Fluorinated Reagent (c) 1H,1H,2H,2H-perfluorooctanol (Wt. %) | Sugar Alcohol (b) Reagent | Wt. % | Additional Monomer N-Butanol (Wt. %) |
|---|---|---|---|---|---|
| 33 | 25.2 | 34.5 | TWEEN 65     | 38.5 | 1.5 |
| 34 | 16.6 | 7.5  | TWEEN 65     | 75.0 | 1.0 |
| 35 | 28.1 | 38.0 | Tribehenin 88 | 32.3 | 1.6 |
| 36 | 20.1 | 9.1  | Tribehenin 88 | 69.6 | 1.2 |

TABLE 9

Performance Data of Examples 33 to 36

|  | Cotton | | | Polyester | | |
|---|---|---|---|---|---|---|
|  | Water Drop | Oil Drop | Spray | Water Drop | Oil Drop | Spray |
| Ex. 33 | 4 | 6 | 80 | 4 | 5 | 70 |
| Ex. 34 | 0 | 1 | 50 | 1 | 1 | 50 |
| Ex. 35 | 4 | 6 | 90 | 4 | 6 | 70 |
| Ex. 36 | 4 | 5 | 90 | 4 | 5 | 70 |

EXAMPLES 37 to 48

Examples 37 to 48 follow the procedures of Examples 1-10. Amounts of each compound are shown in Table 10. Performance data is shown in Table 11.

TABLE 10

Compositions of Examples 37 to 48

| Ex. | Isocyante (a) DESMO-DUR N100 (Wt. %) | Fluorinated Reagent (c) C6, 1-VDF alcohol | Sugar alcohol (b) Reagent | Wt. % | Additional Monomer N-Butanol (Wt. %) |
|---|---|---|---|---|---|
| 37 | 28.1 | 44.7 | STS30         | 25.6 | 1.6 |
| 38 | 23.1 | 12.3 | STS30         | 63.3 | 1.3 |
| 39 | 24.0 | 38.3 | Tween 65      | 36.3 | 1.4 |
| 40 | 16.4 | 8.7  | Tween 65      | 74.0 | 0.9 |
| 41 | 26.3 | 41.8 | Tribehenin 88 | 30.3 | 1.5 |
| 42 | 19.8 | 10.5 | Tribehenin 88 | 68.5 | 1.1 |
| 43 | 26.1 | 48.3 | STS30         | 24.1 | 1.5 |
| 44 | 22.7 | 13.8 | STS30         | 62.1 | 1.3 |
| 45 | 22.8 | 41.6 | Tween 65      | 34.3 | 1.3 |
| 46 | 16.2 | 9.8  | Tween 65      | 73.1 | 0.9 |
| 47 | 24.8 | 45.3 | STS30         | 28.5 | 1.4 |
| 48 | 19.5 | 11.9 | STS30         | 67.5 | 1.1 |

TABLE 11

Performance Data of Examples 37 to 48

|  | Cotton | | | Polyester | | |
|---|---|---|---|---|---|---|
|  | Water Drop | Oil Drop | Spray | Water Drop | Oil Drop | Spray |
| Ex. 37 | 7 | 6 | 100 | 6  | 6 | 95 |
| Ex. 38 | 5 | 5 | 100 | 6  | 5 | 95 |
| Ex. 39 | 5 | 6 | 90  | 10 | 6 | 80 |
| Ex. 40 | 0 | 0 | 50  | 3  | 1 | 50 |
| Ex. 41 | 8 | 6 | 100 | 8  | 6 | 90 |
| Ex. 42 | 5 | 6 | 95  | 8  | 6 | 95 |
| Ex. 43 | 4 | 0 | 100 | 3  | 0 | 90 |
| Ex. 44 | 4 | 0 | 95  | 4  | 0 | 70 |
| Ex. 45 | 4 | 0 | 70  | 1  | 1 | 50 |
| Ex. 46 | 0 | 0 | 50  | 1  | 0 | 50 |
| Ex. 47 | 4 | 0 | 100 | 4  | 0 | 80 |
| Ex. 48 | 4 | 0 | 100 | 4  | 0 | 80 |

EXAMPLES 49 and 58

The following general procedure was followed to produce the samples for Examples 49-58. Amounts of each compound are shown in Table 12.

In a small vial equipped with a stir bar and nitrogen flow was added compound (a), MIBK, and catalyst and heated to 60 C. Next MPEG 750 was added and the temperature was increased to 95 C. After 1 hour, compound (b) and compound (c) were added. The reaction was run overnight at 95 C and then tested active isocyantes in the morning. The samples were then applied to cotton and polyester at 100 g/L (Performance data in Table 13a). Additionally, treated cotton fabrics were tested for stain release properties according to Test Method 4, above (Performance data in Table 13b).

TABLE 12

Compositions of Examples 49 to 58

| Ex. | Isocyante (a) DESMO-DUR N100 (Wt. %) | Fluorinated Reagent (c) 1H,1H,2H,2H Perfluorohexanol (Wt. %) | Sugar alcohol (b) Reagent | Wt. % | Additional Monomer MPEG 750 (Wt. %) |
|---|---|---|---|---|---|
| Ex. 49 | 25.0 | 13.0 | sorbitan tristearate | 12.4 | 49.6 |

TABLE 12-continued

Compositions of Examples 49 to 58

| Ex. | Isocyante (a) DESMODUR N100 (Wt. %) | Fluorinated Reagent (c) 1H,1H,2H,2H Perfluorohexanol (Wt. %) | Sugar alcohol (b) Reagent | Wt. % | Additional Monomer MPEG 750 (Wt. %) |
|---|---|---|---|---|---|
| Ex. 50 | 23.1 | 12.2 | TWEEN 65 | 18.8 | 45.9 |
| Ex. 51 | 24.7 | 12.9 | sorbitan tribehenin | 14.7 | 47.7 |
| Ex. 52 | 23.6 | 12.4 | sorbitan trioleate | 14.5 | 49.5 |
| Ex. 53 | 21.7 | 3.7 | sorbitan tristearate | 31.8 | 42.8 |
| Ex. 54 | 18.4 | 3.2 | TWEEN 65 | 42.9 | 35.5 |
| Ex. 55 | 20.4 | 3.5 | sorbitan tribehenin | 36.6 | 39.5 |
| Ex. 56 | 20.6 | 3.6 | sorbitan trioleate | 36.3 | 39.5 |
| Ex. 57 | 23.3 | 12.1 | decaglycerol decastearate | 18.5 | 46.1 |
| Ex. 58 | 17.6 | 5.0 | decaglycerol decastearate | 42.3 | 35.1 |

TABLE 13a

Performance Data of Examples 49 to 58

| | Cotton | | | Polyester | | |
|---|---|---|---|---|---|---|
| | Water Drop | Oil Drop | Spray | Water Drop | Oil Drop | Spray |
| Ex. 49 | 0 | 0 | 50 | 0 | 0 | 0 |
| Ex. 50 | 0 | 0 | 0 | 0 | 0 | 0 |
| Ex. 51 | 0 | 0 | 50 | 0 | 0 | 0 |
| Ex. 52 | 0 | 0 | 0 | 0 | 0 | 0 |
| Ex. 53 | 2 | 0 | 60 | 0 | 0 | 0 |
| Ex. 54 | 0 | 0 | 0 | 0 | 0 | 0 |
| Ex. 55 | 1 | 0 | 70 | 1 | 0 | 0 |
| Ex. 56 | 0 | 0 | 0 | 0 | 0 | 0 |
| Ex. 57 | 0 | 0 | 0 | 0 | 0 | 0 |
| Ex. 58 | 3 | 0 | 70 | 0 | 0 | 0 |

TABLE 13b

Performance Data of Examples 49 to 58

| | Cotton Stain Release | |
|---|---|---|
| | Corn Oil | Mineral Oil |
| Ex. 49 | 2.5 | 2.5 |
| Ex. 50 | 2 | 2 |
| Ex. 51 | 3 | 3 |
| Ex. 52 | 1.5 | 1.5 |
| Ex. 53 | 3 | 2 |
| Ex. 54 | 2 | 2 |
| Ex. 55 | 3.5 | 3 |
| Ex. 56 | 1 | 1 |
| Ex. 57 | 3 | 3 |
| Ex. 58 | 3.5 | 3 |

EXAMPLES 59 to 75

Examples 59 to 75 were prepared following general procedure of Examples 49-58. Amounts of each compound are shown in Table 14. Performance data is shown in Tables 15a and 15b.

TABLE 14

Compositions of Examples 59 to 75

| Ex. | Isocyante (a) DESMODUR N100 (Wt. %) | Sugar alcohol (b) STS30 Sorbitan tristearate (Wt. %) | Fluorinated Reagent (c) Reagent | Wt. % | Additional Monomer MPEG 750 (Wt. %) |
|---|---|---|---|---|---|
| 59 | 23.0 | 22.2 | Perfluorobutylthioether ethyl alcohol | 9.8 | 45.1 |
| 60 | 22.9 | 22.2 | C4, 1-VDF Alcohol | 9.9 | 45.1 |
| 61 | 23.0 | 22.2 | Perfluorobutylthioether ethyl amine | 9.7 | 45.1 |
| 62 | 22.9 | 22.2 | PPVE alcohol | 9.9 | 45.0 |
| 63 | 22.3 | 21.6 | Perfluorobutylthioether ethyl alcohol | 12.4 | 43.8 |
| 64 | 22.3 | 21.6 | Perfluorobutylthioether ethyl amine | 12.4 | 43.8 |
| 65 | 15.3 | 14.8 | KRYTOX KFA-220AL | 40.0 | 30.0 |
| 66 | 22.7 | 21.9 | Perfluorhexylethyl amine | 10.8 | 44.6 |
| 67 | 23.7 | 23.0 | 1-Butanol, 3,4,4-tetrafluoro-3-(trifluoromethyl) | 6.7 | 46.6 |
| 68 | 23.6 | 22.9 | 1-pentanol, 4,5,5,5-tetrafluoro-4-(trifluoromethyl) | 7.1 | 46.4 |
| 69 | 21.9 | 21.2 | N-methyl-RF6-sulfonamide | 13.9 | 43.0 |
| 70 | 21.8 | 21.1 | N-ethyl-RF6-sulfonamide | 14.3 | 42.8 |
| 71 | 22.2 | 21.4 | C6-triazole alcohol | 12.9 | 43.5 |
| 72 | 22.5 | 21.7 | Fraction 6 EVE alcohol | 11.6 | 44.2 |

TABLE 14-continued

Compositions of Examples 59 to 75

| Ex. | Isocyante (a) DESMODUR N100 (Wt. %) | Sugar alcohol (b) STS30 Sorbitan tristearate (Wt. %) | Fluorinated Reagent (c) Reagent | Wt. % | Additional Monomer MPEG 750 (Wt. %) |
|---|---|---|---|---|---|
| 73 | 23.3 | 22.5 | (see structure) | 8.5 | 45.7 |
| 74 | 22.9 | 22.2 | (see structure) | 9.9 | 45.0 |
| 75 | 21.9 | 21.1 | ETFE Alcohol | 14.1 | 42.9 |

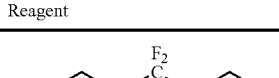

TABLE 15a

Performance Data of Examples 59 to 75

| | Cotton | | | Polyester | | |
|---|---|---|---|---|---|---|
| | Water Drop | Oil Drop | Spray | Water Drop | Oil Drop | Spray |
| Ex. 59 | 3 | 0 | 70 | 0 | 1 | 0 |
| Ex. 60 | 3 | 0 | 70 | 0 | 1 | 0 |
| Ex. 61 | 0 | 0 | 60 | 0 | 2 | 0 |
| Ex. 62 | 3 | 0 | 70 | 0 | 1 | 0 |
| Ex. 63 | 3 | 0 | 70 | 0 | 1 | 0 |
| Ex. 64 | 3 | 6 | 60 | 3 | 4 | 0 |
| Ex. 65 | 1 | 5 | 50 | 0 | 4 | 0 |
| Ex. 66 | 1 | 2 | 60 | 0 | 2 | 0 |
| Ex. 67 | 2 | 0 | 60 | 0 | 0 | 0 |
| Ex. 68 | 2 | 0 | 60 | 0 | 0 | 0 |
| Ex. 69 | 3 | 5 | 70 | 1 | 3 | 0 |
| Ex. 70 | 1 | 2 | 50 | 0 | 3 | 0 |
| Ex. 71 | 3 | 6 | 70 | 0 | 4 | 0 |
| Ex. 72 | 3 | 0 | 70 | 3 | 1 | 0 |
| Ex. 73 | 2 | 0 | 70 | 0 | 0 | 0 |
| Ex. 74 | 2 | 0 | 70 | 1 | 0 | 0 |
| Ex. 75 | 2 | 0 | 75 | 3 | 0 | 50 |

TABLE 15b

Performance Data of Examples 59 to 75.

| | Cotton Stain Release | |
|---|---|---|
| | Corn Oil | Mineral Oil |
| Ex. 59 | 3 | 3 |
| Ex. 60 | 3 | 3 |
| Ex. 61 | 3 | 2.5 |
| Ex. 62 | 3 | 3 |
| Ex. 63 | 3 | 3 |
| Ex. 64 | 4.5 | 4 |
| Ex. 65 | 3.5 | 3.5 |
| Ex. 66 | 3 | 3 |
| Ex. 67 | 3 | 3 |
| Ex. 68 | 3 | 2 |
| Ex. 69 | 4.5 | 4 |
| Ex. 70 | 3.5 | 3.5 |
| Ex. 71 | 4.5 | 3.5 |
| Ex. 72 | 3 | 2.5 |
| Ex. 73 | 2 | 1 |
| Ex. 74 | 3 | 3 |
| Ex. 75 | 3 | 2.5 |

EXAMPLES 76 to 78

Examples 76 to 78 were prepared according to the following general procedure. Into a 4-neck round bottom flask equipped with an overhead stirrer, thermocouple, nitrogen inlet, gas outlet and condenser was added compound (a) (Examples 76 and 77 used DESMODUR N3300, all other Examples used DESMODUR N100), solvent (toluene), and FeCl3 dissolved in MIBK. The reaction mixture was heated to 60 C. MPEG 750 was added to the flask. An exothermic reaction to 63 C was noted and then the temperature was raised to 95 C and the mixture was stirred for 1 hour and then cooled to 60 C. A 50 wt % solution of compound (b) in toluene and compound (c) were added to the flask. The temperature was increased to 95 C and stirred overnight. Once the mixture tested negative for isocyantes, warm DI water was added and the mixture was stirred for 30 minutes at 75 C. Solvent was removed via distillation. Product was filtered through a sock filter and diluted to 15% solids. Products were tested at 100 g/L.

EXAMPLES 79 to 84

Examples 79 to 84 follow the procedures of Examples 76-78, but using an additional compound (b) as shown in Table 16. The additional compounds (b) were added to the reaction after the initial reaction mixture had reacted overnight. Once the mixture tested negative for isocyantes, warm DI water was added and the mixture was stirred for 30 minutes at 75 C. Solvent was removed via distillation. Product was filtered through a sock filter and diluted to 20% solids. Products were tested at 90 g/L.

Amounts of each component are shown in Table 16. Products were tested as in Examples 59-75. Performance data is shown in Tables 17a and 17b.

TABLE 16

Compositions of Examples 76 to 84

| Ex. | Isocyante (a) DESMODUR N100 (Wt. %) (N3300 for Ex. 76-77) | Fluorinated Reagent (c) 1H,1H,2H,2H-perfluorooctanol (Wt. %) | Sugar alcohol (b) Reagent | Wt. % | Sugar alcohol (b) Reagent | Wt. % | Additional Monomer MPEG 750 (Wt. %) |
|---|---|---|---|---|---|---|---|
| 76 | 31.78 | 36.41 | Sorbitan Monostearate | 5.54 | — | | 26.27 |
| 77 | 28.38 | 29.48 | Sorbitan Monostearate | 1.65 | — | | 40.49 |
| 78 | 33.31 | 28.09 | Sorbitan Monostearate | 15.45 | — | | 23.15 |
| 79 | 21.02 | 4.81 | sorbitan tristearate | 32.0 | Sorbitan Monostearate | 2.56 | 39.63 |
| 80 | 22.31 | 10.25 | sorbitan tristearate | 22.6 | Sorbitan Monostearate | 2.72 | 42.08 |
| 81 | 23.81 | 16.33 | sorbitan tristearate | 12.1 | Sorbitan Monostearate | 2.90 | 44.89 |
| 82 | 24.90 | 2.34 | sorbitan tristearate | 29.7 | Sorbitan Monostearate | 9.17 | 33.86 |
| 83 | 25.56 | 4.81 | sorbitan tristearate | 25.5 | Sorbitan Monostearate | 9.41 | 34.76 |
| 84 | 27.79 | 13.11 | sorbitan tristearate | 11.1 | Sorbitan Monostearate | 10.24 | 37.80 |

TABLE 17a

Performance Data of Examples 76 to 84

| | Cotton | | | Polyester | | |
|---|---|---|---|---|---|---|
| | Water Drop | Oil Drop | Spray | Water Drop | Oil Drop | Spray |
| Ex. 76 | — | — | — | — | — | — |
| Ex. 77 | — | — | — | — | — | — |
| Ex. 78 | 5 | 5 | 70 | 3 | 5 | 70 |
| Ex. 79 | 3 | 0 | 50 | 3 | 0 | 0 |
| Ex. 80 | 1 | 1 | 50 | 0 | 1 | 0 |
| Ex. 81 | 1 | 2 | 50 | 0 | 1 | 0 |
| Ex. 82 | 3 | 0 | 70 | 3 | 0 | 0 |
| Ex. 83 | 3 | 0 | 50 | 0 | 0 | 0 |
| Ex. 84 | 1 | 0 | 50 | 0 | 1 | 0 |

TABLE 17b

Performance Data of Examples 76 to 84

| | Cotton Stain Release | |
|---|---|---|
| | Corn Oil | Mineral Oil |
| Ex. 76 | 3 | 3.5 |
| Ex. 77 | 3.5 | 3 |
| Ex. 78 | 4.5 | 5 |
| Ex. 79 | 4 | 3.5 |
| Ex. 80 | 4 | 4 |
| Ex. 81 | 4.5 | 4.5 |
| Ex. 82 | 4 | 4 |
| Ex. 83 | 4 | 3 |
| Ex. 84 | 4 | 4 |

EXAMPLES 85 to 102

Examples 85 to 102 were prepared following general procedure of Examples 49-58. Amounts of each compound are shown in Table 18. Performance data is shown in Tables 19a and 19b.

TABLE 18

Compositions of Examples 85 to 102

| Ex. | Isocyante (a) DESMODUR N100 (Wt. %) | Sugar alcohol (b) Reagent | Wt. % | Fluorinated Reagent (c) Reagent | Wt. % | Additional Monomer Wt. % MPEG 750 (Wt. %) |
|---|---|---|---|---|---|---|
| 85 | 24.1 | sorbitan tristearate | 11.6 | 6,2-alcohol | 17.2 | 47.1 |
| 86 | 21.6 | sorbitan tristearate | 31.1 | 6,2-alcohol | 5.1 | 42.2 |
| 87 | 22.4 | TWEEN 65 | 17.8 | 6,2-alcohol | 16.0 | 43.8 |
| 88 | 17.9 | TWEEN 65 | 42.7 | 6,2-alcohol | 4.3 | 35.1 |
| 89 | 23.4 | sorbitan tribehenin | 14.2 | 6,2-alcohol | 16.7 | 45.8 |

TABLE 18-continued

Compositions of Examples 85 to 102

| Ex. | Isocyante (a) DESMODUR N100 (Wt. %) | Sugar alcohol (b) Reagent | Wt. % | Fluorinated Reagent (c) Reagent | Wt. % | Additional Monomer Wt. % MPEG 750 (Wt. %) |
|---|---|---|---|---|---|---|
| 90 | 20.0 | sorbitan tribehenin | 36.3 | 6,2-alcohol | 4.7 | 39.0 |
| 91 | 23.4 | sorbitan tristearate | 11.2 | C6,1-VDF alcohol | 19.6 | 45.8 |
| 92 | 21.4 | sorbitan tristearate | 30.8 | C6,1-VDF alcohol | 6.0 | 41.8 |
| 93 | 21.8 | TWEEN 65 | 17.3 | C6,1-VDF alcohol | 18.2 | 42.6 |
| 94 | 17.8 | TWEEN 65 | 42.4 | C6,1-VDF alcohol | 5.0 | 34.8 |
| 95 | 22.7 | sorbitan tribehenin | 13 8 | C6,1-VDF alcohol | 19.0 | 44.5 |
| 96 | 19.8 | sorbitan tribehenin | 36.0 | C6,1-VDF alcohol | 5.5 | 38.7 |
| 97 | 22.7 | sorbitan tristearate | 10.9 | C6,1-VDF alcohol | 21.9 | 44.5 |
| 98 | 21.2 | sorbitan tristearate | 30.5 | C6,1-VDF alcohol | 6.8 | 41.5 |
| 99 | 21.2 | TWEEN 65 | 16.8 | C6,1-VDF alcohol | 20.4 | 41.5 |
| 100 | 17.7 | TWEEN 65 | 42.1 | C6,1-VDF alcohol | 5.7 | 34.6 |
| 101 | 20.0 | sorbitan tribehenin | 15.8 | C6,1-VDF alcohol | 25.0 | 39.2 |
| 102 | 19.6 | sorbitan tribehenin | 35.7 | C6,1-VDF alcohol | 6.3 | 38.4 |

TABLE 19a

Performance Data of Examples 85 to 102

| | Cotton | | | Polyester | | |
|---|---|---|---|---|---|---|
| | Water Drop | Oil Drop | Spray | Water Drop | Oil Drop | Spray |
| Ex. 85 | 0 | 5 | 0 | 0 | 5 | 0 |
| Ex. 86 | 0 | 2 | 80 | 0 | 1 | 0 |
| Ex. 87 | 2 | 4 | 0 | 0 | 3 | 0 |
| Ex. 88 | 0 | 2 | 0 | 0 | 0 | 0 |
| Ex. 89 | 0 | 6 | 50 | 0 | 6 | 0 |
| Ex. 90 | 0 | 4 | 50 | 0 | 3 | 0 |
| Ex. 91 | 0 | 3 | 50 | 0 | 2 | 50 |
| Ex. 92 | 3 | 0 | 90 | 0 | 0 | 50 |
| Ex. 93 | 0 | 1 | 0 | 0 | 0 | 0 |
| Ex. 94 | 0 | 0 | 0 | 0 | 0 | 0 |
| Ex. 95 | 3 | 3 | 80 | 1 | 5 | 50 |
| Ex. 96 | 2 | 0 | 90 | 0 | 0 | 50 |
| Ex. 97 | 6 | 3 | 80 | 6 | 6 | 50 |
| Ex. 98 | 4 | 0 | 80 | 4 | 2 | 50 |
| Ex. 99 | 4 | 6 | 50 | 5 | 6 | 50 |
| Ex. 100 | 0 | 0 | 0 | 0 | 0 | 0 |
| Ex. 101 | 5 | 6 | 80 | 5 | 6 | 50 |
| Ex. 102 | 4 | 1 | 70 | 4 | 2 | 50 |

TABLE 19b

Performance Data of Examples 85 to 102

| | Cotton Stain Release | |
|---|---|---|
| | Corn Oil | Mineral Oil |
| Ex. 85 | 4 | 3 |
| Ex. 86 | 4 | 3 |
| Ex. 87 | 3 | 2 |
| Ex. 88 | 3 | 2 |

TABLE 19b-continued

Performance Data of Examples 85 to 102

| | Cotton Stain Release | |
|---|---|---|
| | Corn Oil | Mineral Oil |
| Ex. 89 | 4 | 4 |
| Ex. 90 | 4 | 5 |
| Ex. 91 | 3 | 3 |
| Ex. 92 | 3 | 3 |
| Ex. 93 | 2 | 3 |
| Ex. 94 | 3 | 3 |
| Ex. 95 | 5 | 4 |
| Ex. 96 | 3 | 2 |
| Ex. 97 | 5 | 4 |
| Ex. 98 | 5 | 3 |
| Ex. 99 | 5 | 4 |
| Ex. 100 | 3 | 2 |
| Ex. 101 | 5 | 4 |
| Ex. 102 | 4 | 3 |

COMPARATIVE EXAMPLE A

Untreated fabric samples were tested according to the test methods above. Both cotton and polyester fabrics had a water drop rating of 0, an oil drop rating of 0, and a spray rating of 0.

In the above Examples, compound (c):

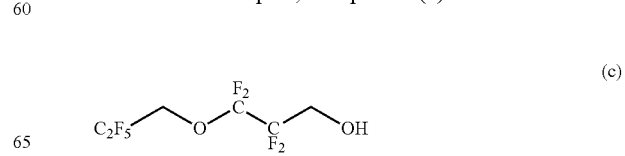

was prepared according to the following steps:

Triphosgene (24.5 g, 82.5 mmol) and anhydrous diethyl ether (~400 mL) were added to a 1-L 4-neck flask. The mixture was cooled to 0° C., and 2,2,3,3,3-pentafluoropropanol (75 g, 0.50 mol) was added. The mixture was stirred for 30 minutes. Pyridine (40.0 g, 0.51 mol) was then slowly added to the mixture via addition funnel. The resultant mixture was then gently refluxed for 1 hour. The solution was filtered to remove white solids and washed with dilute hydrochloric acid solution. The solution was then vacuum distilled to remove ether resulting in bis(2,2,3,3,3-pentafluoropropyl) carbonate ($CF_3CF_2CH_2O)_2CO$ (71 g, 88% yield). A catalyst was first prepared by slow addition of 2,2,3,3,3-pentafluoropropan-1-ol (15.0 g, 100 mmol) to a suspension of sodium hydride (60% in mineral oil, 6.0 g, 150 mmol) in anhydrous tetrahydrofuran (300 mL) in a 500-mL flask. The resultant mixture was stirred for 15 minutes, transferred into a Hastelloy vessel (1 L), and cooled to −20° C. The bis(2,2,3,3,3-pentafluoropropyl) carbonate, $(CF_3CF_2CH_2O)_2CO$, (115 g, 353 mmol) was then added to the vessel. The vessel was pressurized with tetrafluoroethylene (60 g, 600 mmol), and the contents were warmed to room temperature and agitated for 6 hours. The reaction mixture was then treated with a solution of NaOH (15 g, 375 mmol) in water (100 mL). Tetrahydrofuran and water were removed to vacuum, and the resultant solids were dissolved by addition of 3.0 M hydrochloric acid (400 mL). The organic phase was separated to yield 2,2,3,3-tetrafluoro-3-(2,2,3,3,3-pentafluoropropoxy)propanoic acid $C_2F_5CH_2OCF_2CF_2C(O)OH$ (60 g, 58% yield).

The 2,2,3,3-tetrafluoro-3-(2,2,3,3,3-pentafluoropropoxy) propanoic acid (65 g, 220 mmol), ethanol (50 mL, excess), and concentrated sulfuric acid (50 g) were added to a 250 mL round bottom flask. The resultant mixture was refluxed for three hours under atmosphere of nitrogen. The product mixture was slowly added to water (400 mL), the organic layer was separated, washed with water (2×50 mL), and dried over magnesium sulfate to yield ethyl 2,2,3,3-tetrafluoro-3-(2,2,3,3,3-pentafluoropropoxy)propanoate $C_2F_5CH_2OCF_2CF_2C(O)OCH_2CH_3$ (70 g, 98% yield).

Lithium aluminum hydride (5.2 g, 137 mmol) and anhydrous ether (100 mL) were added to a 250-mL round bottom flask, and the mixture was cooled to 5 C. The ethyl 2,2,3,3-tetrafluoro-3-(2,2,3,3,3-pentafluoropropoxy)propanoate (77 g, 240 mmol) was added dropwise, keeping the temperature between 5 and 20° C. The mixture was then washed with diluted hydrochloric acid solution, and the organic phase was separated. The organic phase was purified via distillation to yield 2,2,3,3-tetrafluoro-3-(2,2,3,3,3-pentafluoropropoxy)propan-1-ol $C_2F_5CH_2OCF_2CF_2CH_2OH$ (57 g, 85% yield).

In the above Examples, compound (c):

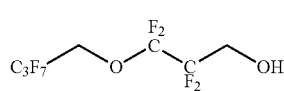

(c)

was prepared according to the following steps:

Triphosgene (24.5 g, 82.6 mmol) and anhydrous diethyl ether (~400 mL) were added to a 1-L 4-neck flask. The mixture was cooled to 0 C and 2,2,3,3,4,4,4-heptafluorobutanol (100 g, 0.50 mol) was added and the mixture was stirred for 30 minutes. Pyridine (40.0 g, 0.51 mol) was then slowly added to the mixture via addition funnel. The resultant mixture was then gently refluxed for 1 hour. The solution was filtered to remove white solids and washed with dilute hydrochloric acid solution. The solution was then vacuum distilled to remove ether resulting in bis(2,2,3,3,4,4,4-heptafluorobutyl) carbonate $(CF3CF2CF2CH2O)_2CO$ (82 g, 80% yield).

A catalyst was first prepared by slow addition of 2,2,3,3,4,4,4-heptafluorobutan-1-ol (15.0 g, 75 mmol) to a suspension of sodium hydride (60% in mineral oil, 4.3 g, 108 mmol) in anhydrous tetrahydrofuran (130 mL) in a 500-mL flask. The resultant mixture was stirred for 15 minutes, transferred into a Hastelloy vessel (400 mL), and cooled to −20 C. Then bis(2,2,3,3,4,4,4-heptafluorobutyl) carbonate (64 g, 150 mmol) was added and the vessel was pressurized with tetrafluoroethylene (30 g, 300 mmol). The vessel was allowed to warm to the ambient temperature and agitated for 6 hours. Then the reaction mixture was treated with a solution of NaOH (8 g, 200 mmol) in water (50 mL). Tetrahydrofuran and water were removed to vacuum, and the resultant solids were dissolved in hydrochloric acid solution (300 mL at 2.0 M). The organic phase was separated to give 2,2,3,3-tetrafluoro-3-(2,2,3,3,4,4,4-heptafluorobutoxy)propanoic acid $C3F7CH2OCF2CF2C(O)OH$ (36 g, 70% yield).

The 2,2,3,3-tetrafluoro-3-(2,2,3,3,4,4,4-heptafluorobutoxy)propanoic acid (34 g, 99 mmol), ethanol (30 mL), and concentrated sulfuric acid (20 g) were added to a 250 mL round bottom flask. The resultant mixture was refluxed for three hours under atmosphere of nitrogen. The product mixture was slowly added to water (300 mL), the organic layer was separated, washed with water (2×50 mL), and dried over magnesium sulfate to yield ethyl 2,2,3,3-tetrafluoro-3-(2,2,3,3,4,4,4-heptafluorobutoxy)propanoate $C3F7CH2OCF2CF2C(O)OCH2CH3$ (35 g, 95% yield).

Lithium aluminum hydride (2.2 g, 58 mmol) and anhydrous ether (50 mL) were added to a 250-mL round bottom flask. The mixture was cooled to 5 C and stirred. The ethyl 2,2,3,3-tetrafluoro-3-(2,2,3,3,4,4,4-heptafluorobutoxy)propanoate (37 g, 99 mmol) was added drop wise to keep the temperature between 5 and 20° C. The mixture was then washed with diluted hydrochloric acid solution, and the organic phase was separated. The organic phase was purified via distillation to yield 2,2,3,3-tetrafluoro-3-(2,2,3,3,4,4,4-heptafluorobutoxy)propan-1-ol $C3F7CH2OCF2CF2CH2OH$ (24 g, 74% yield).

In the above Examples, compound (c), Fraction 6 EVE alcohol, was prepared according to the following steps:

EVE (containing ~3 mol % HF, 750 g, 1.77 mole) was added to anhydrous ETOH (750 ml) and cooled to −3C in a jacketed 5 L RB flask. A 4.5 wt % solution of NaBH4 in EtOH was prepared by addition of 25% NaOMe (~5M/L, 0.185 mls) to 925 mls EtOH and then addition of NaBH4 (41.7 g 0.62 eq) with stirring to dissolve, a small amount of solids remained in suspension. The NaBH4 solution was added to the EVE over 2 hrs with −10 C on the jacket, keeping internal temperature below 5 C. The reaction was kept at <5 C for an additional hour (0 C on jacket) and a mini workup showed absence of EVE. The reaction was drowned into 2.5 L waster containing 60 ml con HCl and stirred for a half hour, and the phases allowed to settle. The bottom organic layer was drained, and filtered to remove solids, and weighed 890 g (theory 697 g). GC showed EtOH, EVE-OH and a higher boiling byproduct peak; the ratio of EVE-OH to byproduct was 90:10. NMR showed a ratio of EtOH to EVE-OH of 2:1 mole to mole.

The product was transferred to a 1 L distillation apparatus equipped with a 12×1 inch column packed with Propack.

Ethanol was removed at a boiling range of 27-35 at 70 mmHg, then final removal at 69 C/20 mmHg. The product distilled at 69-74 C/20 mmHg. A final cut boiling 66-72 at 10 mmHg was taken containing 90% EVE-OH.

The invention claimed is:

1. A compound for imparting water repellency and optionally stain release to substrates wherein the compound is prepared by the process comprising:

reacting (a) at least one isocyanate group-containing compound selected from the group consisting of diisocyanate and polyisocyanate, or mixture thereof; (b) at least one isocyanate-reactive compound selected from the group consisting of cyclic or acyclic sugar alcohol which is substituted with at least two —$R^1$; —$C(O)R^1$; —$(CH_2CH_2O)_n(CH(CH_3)CH_2O)_mC(O)R^1$; or mixtures thereof; where the cyclic or acyclic sugar alcohol is selected from a saccharide, reduced sugar, aminosaccharide, aldonic acid, and aldonic acid lactone;

wherein each n is independently 0 to 20;
each m is independently 0 to 20;
m+n is greater than 0;
each $R^1$ is independently a linear or branched alkyl group having 5 to 29 carbons optionally comprising at least 1 unsaturated bond; and (c) at least one fluorinated isocyanate-reactive compound selected from a fluorinated alcohol, fluorinated thiol, or fluorinated amine.

2. The composition of claim 1, wherein the at least one isocyanate-reactive compound (b) is selected from Formulas (IIa), (IIb), or (IIc):

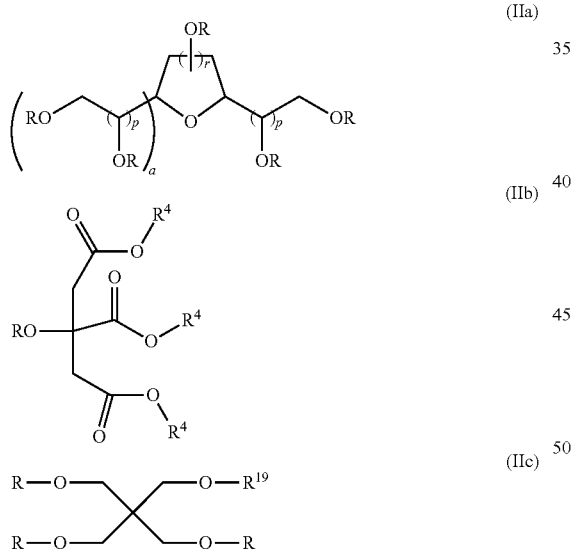

wherein each R is independently —H; —$R^1$; —$C(O)R^1$; or —$(CH_2CH_2O)_n(CH(CH_3)CH_2O)_mC(O)R^1$;
each n is independently 0 to 20;
each m is independently 0 to 20;
m+n is greater than 0;
r is 1 to 3;
a is 0 or 1;
p is independently 0 to 2;
provided that a is 0 when r is 3;
each $R^1$ is independently a linear or branched alkyl group having 5 to 29 carbons optionally comprising at least 1 unsaturated bond;

provided when X is Formula (IIa), then at least two R are a —$R^1$; —$C(O)R^1$; or —$(CH_2CH_2O)_n(CH(CH_3)CH_2O)_mC(O)R^1$;

each $R^4$ is independently —H, a linear or branched alkyl group having 6 to 30 carbons optionally comprising at least 1 unsaturated bond, or combinations thereof; or —$(CH_2CH_2O)_n(CH(CH_3)CH_2O)_mC(O)R^1$; provided when X is Formula (IIb), then at least two of R or $R^4$ are a linear or branched alkyl group having 6 to 30 carbons optionally comprising at least 1 unsaturated bond, or combinations thereof; or —$(CH_2CH_2O)_n(CH(CH_3)CH_2O)_mC(O)R^1$; and each $R^{19}$ is —H, —$C(O)R^1$, or —$CH_2C[CH_2OR]_3$, provided when X is Formula (IIc), then at least two of $R^{19}$ or R are —$C(O)R^1$, or —$(CH_2CH_2O)_n(CH(CH_3)CH_2O)_mC(O)R^1$.

3. The composition of claim 1, wherein the diioscyanate or polyisocyanate is selected from the group consisting of hexamethylene diisocyanate homopolymer, 3-isocyanatomethyl-3,4,4-trimethylcyclohexyl isocyanate, bis-(4-isocyanatocylohexyl)methane and diisocyanate trimers of formulas (Ia), (Ib), (Ic) and (Id):

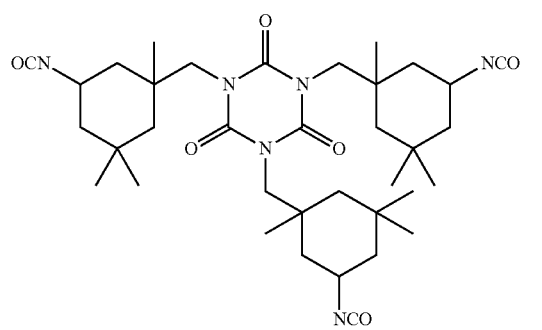

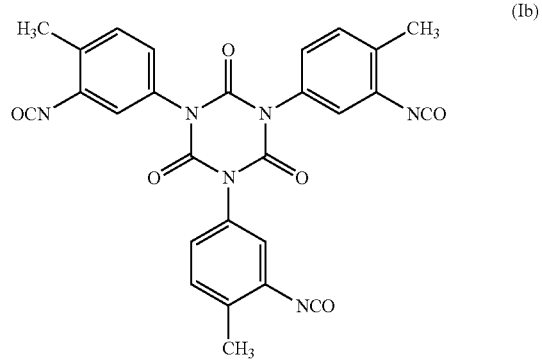

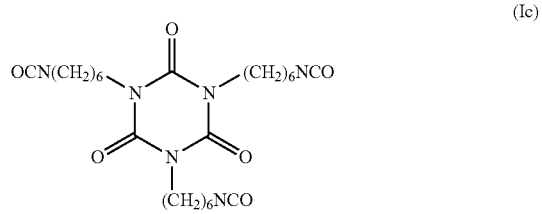

-continued

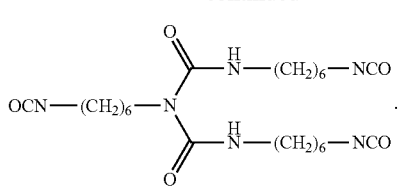

(Id)

4. The composition of claim 1, wherein the at least one fluorinated isocyanate-reactive compound (c) is at least one compound of the formula $$R_f A_x\text{-}Z\text{—H} \quad (III)$$

wherein
$R_f$ is a C1 to C20 linear or branched perfluoroalkyl optionally interrupted by one, two or three ether oxygen atoms;
X is 0 or 1;
A is $(CH_2)_k$, $(CH_2CF_2)_m(CH_2)_n$, $(CH_2)_oSO_2N(CH_3)(CH_2)_p$, $O(CF_2)_2(CH_2)_r$, or $OCHFCF_2OE$;
Z is O, S, or NH;
m is 1 to 4;
k, n, o, p, and r are each independently 1 to 20; and
E is a $C_2$ to $C_{20}$ linear or branched alkyl group optionally interrupted by oxygen, sulfur, or nitrogen atoms; a cyclic alkyl group, or a $C_6$ to $C_{10}$ aryl group.

5. The composition of claim 4, where $R_f$ is an uninterrupted linear $C_2$ to $C_6$ perfluoroalkyl, and x is 1.

6. The composition of claim 1, wherein further comprising reacting (d) at least one compound selected from water, at least one organic compound of Formula (IVa)

$$R^5\text{—X} \quad (IVa),$$

at least one organic compound of Formula (IVb)

$$R^{15}\text{—}(OCH_2CH(OR^{16})CH_2)_z\text{—}OR^{17} \quad (IVb),$$

or mixtures thereof; wherein
$R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl,

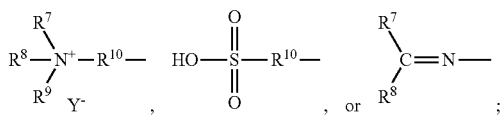

wherein
$R^7$, $R^8$, and $R^9$ are each independently, —H, —$C_1$ to $C_6$ alkyl, or combinations thereof;
$R^{10}$ is a divalent alkyl group of 1 to 20 carbons;
X is an isocyanate-reactive group selected from —OH, —C(O)OH, —SH, —NH($R^{12}$), —O—$(CH_2CH_2O)_s$ $(CH(CH_3)CH_2O)_t$—H or —[C(O)]—O—$(CH_2CH_2O)_s$ $(CH(CH_3)CH_2O)_t$—H;
$R^{12}$ is —H or a monovalent C1 to C6 alkyl group;
$R^{15}$, $R^{16}$, and $R^{17}$ are each independently a —H; —$R^{18}$; —C(O)$R^{18}$ provided that at least one $R^{15}$, $R^{16}$, or $R^{17}$ is a —H;

$R^{18}$ is independently a linear or branched alkyl group having 5 to 29 carbons optionally comprising at least 1 unsaturated bond;
z is 1 to 15;
Y is —Cl;
s is an integer of 0 to 50;
t is an integer of 0 to 50; and
s+t is greater than 0.

7. The composition of claim 2 wherein formula (IIa) is further defined as formula (IIa'):

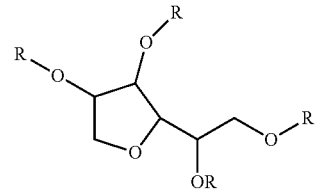

(IIa')

wherein R is independently a —H; —$R^1$; or —C(O)$R^1$.

8. The composition of claim 2 wherein formula (IIa) is further defined as formula (IIa'):

(IIa')

wherein R is independently a —H; or —$(CH_2CH_2O)_n(CH(CH_3)CH_2O)_mC(O)R^1$.

9. The composition of claim 2 wherein (b) is formula (IIb):

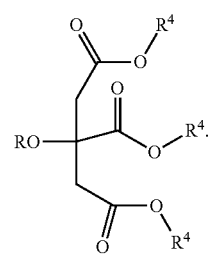

(IIb)

10. The composition of claim 2 wherein (b) is formula (IIc):

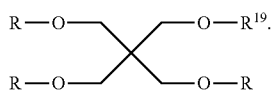

(IIc)

11. A composition for imparting water repellency and optionally stain release to a substrate comprising an aqueous dispersion of the compound of claim 1.

* * * * *